United States Patent [19]

Hatakeyama

[11] Patent Number: 5,353,188
[45] Date of Patent: Oct. 4, 1994

[54] OVERCURRENT DETECTOR CIRCUIT FOR A CIRCUIT-BREAKER

[75] Inventor: Yoshihiro Hatakeyama, Fukuyama, Japan

[73] Assignee: Mitsubishi Denki Kabushiki Kaisha, Tokyo, Japan

[21] Appl. No.: 25,945

[22] Filed: Mar. 3, 1993

[30] Foreign Application Priority Data

Mar. 4, 1992 [JP] Japan .................. 4-047055

[51] Int. Cl.$^5$ .................................. H02H 3/08
[52] U.S. Cl. ........................... 361/97; 361/93
[58] Field of Search ............... 361/93, 87, 88, 94, 361/95, 96, 97, 23

[56] References Cited

U.S. PATENT DOCUMENTS

| | | | |
|---|---|---|---|
| 4,623,967 | 11/1986 | Naimer | 361/93 |
| 4,689,712 | 8/1987 | Demeyer | 361/96 |
| 4,695,961 | 9/1987 | Arinobu | 361/59 |
| 4,819,125 | 4/1989 | Arinobu et al. | 361/97 |

Primary Examiner—A. D. Pellinen
Assistant Examiner—S. Jackson
Attorney, Agent, or Firm—Burns, Doane, Swecker & Mathis

[57] ABSTRACT

An overcurrent detector circuit for a circuit-breaker includes two systems for overcurrent detection. In the first system, the level of the current detected by the current detectors 41 is converted to a digital signal by the A/D converter 91 at each 500 microseconds. The maximum value detector 92 selects the maximum value among these digital signals over each period of 12.5 milliseconds. When the maximum value is greater than a pick-up level, the square thereof is accumulated in the counter 95. In the second system, the calculation circuit 96 squares the digital signals of the A/D converter 91, and switches its outputs in order to the counters 97-1 through 97-5 at a period of 25 milliseconds. Thus, the four counters other than that currently coupled to the calculation circuit 96 hold together the squares of the digital signals accumulated over 100 milliseconds. When this value held jointly by the four counters exceeds a predetermined pick-up level, a value corresponding to the sum is calculated and accumulated in the counter 100. When the output of the counter 95 or 100 exceeds a threshold level, a trip judgment circuit 101 outputs a tripping signal to the switching device 70 to activate the tripping device 71.

6 Claims, 3 Drawing Sheets

OVERCURRENT DETECTOR CIRCUIT FOR A CIRCUIT-BREAKER

BACKGROUND OF THE INVENTION

This invention relates to overcurrent detector circuits for circuit-breakers for protecting power lines.

FIG. 3 is a block diagram showing a conventional overcurrent detector circuit for a circuit-breaker, which is disclosed, for example, in Japanese Laid-Open Patent (Kokai) No. 60-223418. A three-phase AC line 10 having source side terminals 11, 12, 13 and load side terminals 21, 22, 23 is provided with breaker contacts 31, 32, 33 for respective phase lines. The currents flowing through respective phases are detected by the current detectors 41, 42, 43, which may consist of current transformers.

The output of the full-wave rectifier 51 is first rectified by a full-wave rectifier 51, and the burden circuit 52 converts the the rectified output of the full-wave rectifier 51 to a corresponding voltage. A sampling timing signal generator 53 generates the sampling timing signal. An A/D converter 54 samples the output of the burden circuit 52 in synchronism with the timing signal output from the sampling timing signal generator 53 and effects an A/D conversion thereon. A count value determiner 55 calculates and determines the count value corresponding to the digital output of the A/D converter 54.

A counter 56 counts or adds up the output of the count value determiner 55. A judgment timing signal generator 57 generates the judgement timing signal. A pick-up judgment circuit 58 compares the output of the counter 56 with a predetermined threshold level in synchronism with the timing signal of the judgment timing signal generator 57, and determines an occurrence of a pick-up level when the output of the counter 56 becomes greater than the predetermined threshold level. Further, a counter 59 counts the outputs of the pick-up judgment circuit 58, and a trip judgment circuit 60 judges whether or not the count value of the counter 59 exceeds a predetermined threshold level. In response to the output of the trip judgment circuit 60, a switching device 70 generates a switching signal. Further, in response to the output of the switching device 70, a tripping device 71 breaks the breaker contacts 31 through 33. The control circuits 80 and 81 each consist of parts similar to the parts 51 through 60 described above.

Next, the operation of the circuit of FIG. 3 is described in detail. The output of the current detectors 41 is full-wave rectified by the full-wave rectifier 51, and the burden circuit 52 converts the the rectified output of the full-wave rectifier 51 to a corresponding voltage. Further, the output of the burden circuit 52, which corresponds to the phase current level detected by the current detector 41, is converted to a corresponding digital signal by the A/D converter 54 in synchronism with the sampling timing signal supplied from the sampling timing signal generator 53. On the basis of the digital output of the A/D converter 54, the count value determiner 55 determines the count value corresponding thereto in accordance with the anti-time-limiting operation characteristic of the circuit-breaker. The counter 56 adds up the count values supplied thereto from the count value determiner 55 at the sampling timings.

The pick-up judgment circuit 58 compares the output of the counter 56 with a predetermined threshold level in synchronism with the judgement timing signal supplied from the judgment timing signal generator 57, and determines an occurrence of a pick-up level when the output of the counter 56 exceeds the predetermined threshold level. The counter 59 counts (adds up) the outputs of the pick-up judgment circuit 58 supplied thereto in synchronism with the judgement timing signal of the judgment timing signal generator 57. When the output of the counter 59 exceeds a predetermined threshold level, the trip judgment circuit 60 outputs a tripping signal. In response to the output of the trip judgment circuit 60 (or similar signals output from the corresponding parts within the control circuits 80 and 81), the switching device 70 activates the tripping device 71 to break the breaker contacts 31 through 33 of the three-phase AC line 10.

The above conventional circuit-breaker, however, has the following disadvantage. If the sampling interval for the pick-up judgement is set at a relatively long period of 100 milliseconds, for example, for the purpose of ensuring stable tripping operation, it becomes impossible to realize a short delay time operation. Namely, the tripping requires 100 milliseconds at the shortest, and the delay time can only be controlled in units of 100 milliseconds.

SUMMARY OF THE INVENTION

It is therefore an object of this invention to provide a circuit-breaker by which the delay time can be adjusted in small units or steps, and in addition, a stable detecting and tripping operation is realized, The above object is accomplished in accordance with the principle of this invention by an overcurrent detector circuit for a circuit-breaker including at least one contact for disconnecting a line, and a tripping device means for breaking the contact, the overcurrent detector circuit comprising:

current detector means for detecting a current flowing through the line, the current detector generating an output corresponding to a detected current;

analog-to-digital converter means, coupled to the current detector means, for sampling the output of the current detector at a first predetermined period and converting sampled outputs of the current detector to corresponding digital signals;

maximum value detector means, coupled to the analog-to-digital converter means, for determining a maximum value of the digital signals output from the analog-to-digital converter means within each second predetermined period longer than the first period;

first accumulation means, coupled to the maximum value detector means, for accumulating values corresponding to the maximum values determined by the maximum value detector means exceeding a first threshold level;

second accumulation means, coupled to the analog-to-digital converter means, for accumulating values corresponding to the digital signals output from the analog-to-digital converter means during each third predetermined period longer than the second period;

third accumulation means, coupled to the second accumulation means, for accumulating values corresponding to output values of the second accumulation means exceeding a second threshold level; and judgement means, coupled to the first and third accumulation means, for activating the tripping device means to break the contact when an output of the second accumulation means exceeds a third threshold level or when an output of the third accumulation means exceeds a fourth threshold level.

Preferably, the second period is an integral multiple of the first period and the third period is an integral multiple of the second period. It is further preferred that the second accumulation means includes: calculation circuit means for squaring the digital signals of the analog-to-digital converter means; and means for accumulating output values the calculation circuit means over the third period. This accumulating means may consist of: at least three counters arranged in order and coupled respectively to the calculation circuit means, the counters accumulating output values of the calculation circuit means over the third period, wherein: the calculation circuit means switches outputs thereof in order to the counters at a predetermined fourth period, the third period being an integral multiple of the fourth period; a counter currently receiving outputs from the calculation circuit means accumulates outputs of the calculation circuit means over current fourth period; and counters other than the counter currently receiving outputs from the calculation circuit means together hold output values of the calculation circuit means accumulated over the third period.

Alternatively, the above object is accomplished in accordance with this invention by an overcurrent detector circuit for a circuit-breaker including at least one contact for disconnecting a line carrying an alternating current, and a tripping device means for breaking the contact, the overcurrent detector circuit comprising:
  current detector means for detecting a current flowing through the line, the current detector generating an output corresponding to a waveform of the current;
  half-wave rectifier means coupled to the current detector means, for half-wave rectifying the output waveform of the current detector means, the half-wave rectifier means outputting a half-wave rectified waveform;
  analog-to-digital converter means, coupled to the half-wave rectifier means, for sampling the half-wave rectified waveform at a first predetermined period and converting sampled values to corresponding digital signals;
  waveform synchronism circuit means for detecting a rising point of the half-wave rectified waveform, the waveform synchronism circuit outputting a detection signal upon detection of the rising point;
  first accumulation means, coupled to the analog-to-digital means and the waveform synchronism circuit means, for accumulating squares of the digital signals in response to the detection signal over a second predetermined period longer than the first period, the first accumulation means outputting an accumulation value for each period of the waveform of the current;
  second accumulation means, coupled to the first accumulation means, for accumulating values corresponding to accumulation values output from the first accumulation means exceeding a first threshold level; and
  a judgement means, coupled to the second accumulation means, for activating the tripping device when an output of the second accumulation means exceeds a second threshold level.

Preferably, the second period is not shorter than one half of a period corresponding to a minimum frequency of the current flowing through the line and not longer than a period corresponding to a maximum frequency of the current flowing through the line.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
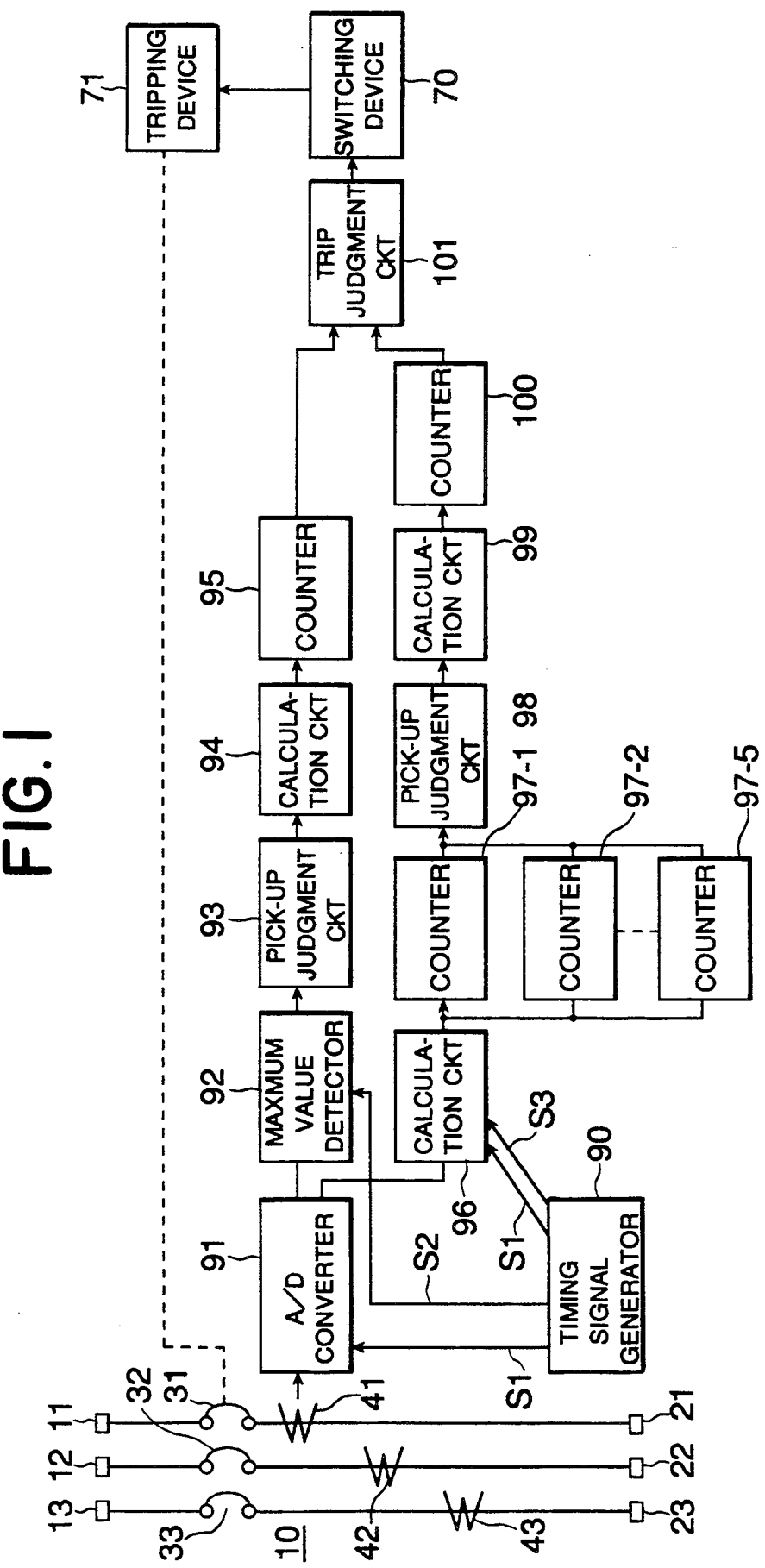
FIG. 1 is a block diagram showing the structure of an overcurrent detector circuit for a circuit-breaker according to this invention.
Figure 3:
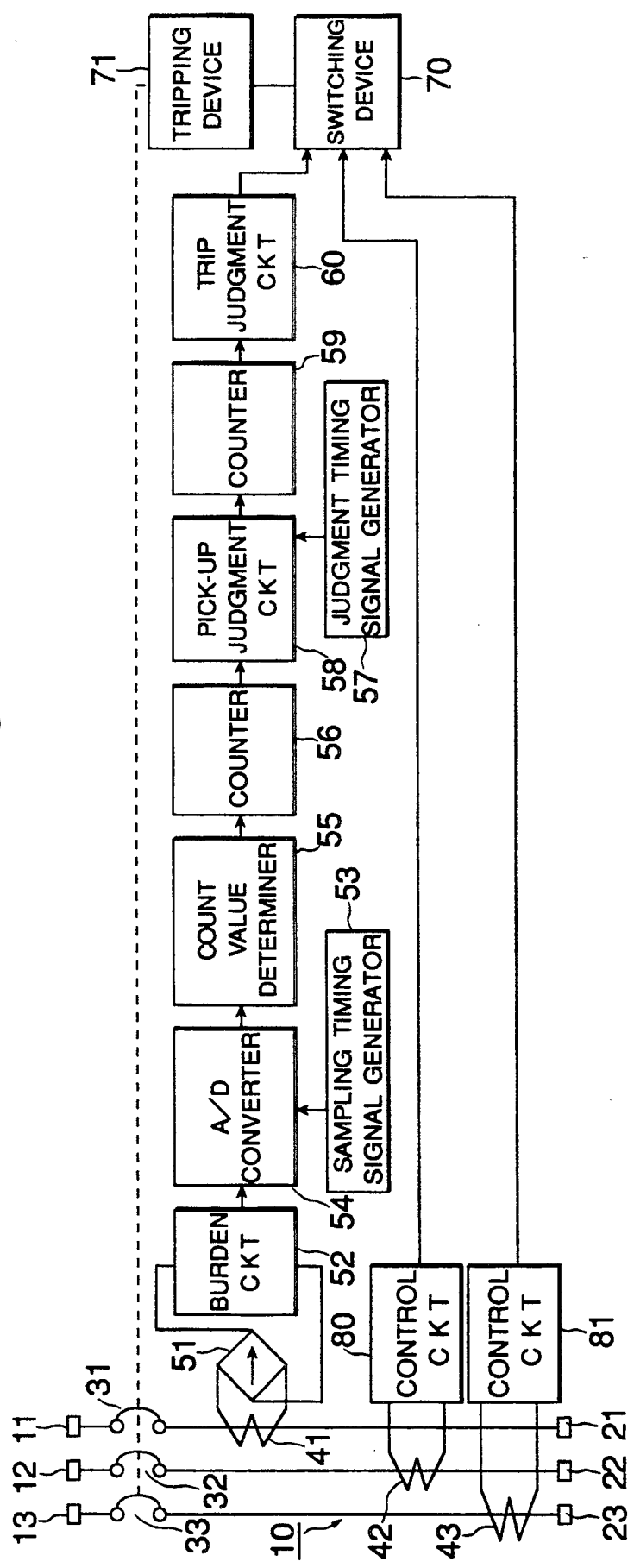
FIG. 3 is a block diagram showing a conventional overcurrent detector circuit for a circuit-breaker.

FIG. 1 is a block diagram showing the structure of an overcurrent detector circuit for a circuit-breaker according to this invention, where the three-phase AC line 10 (including the parts 11 through 13, 21 through 23, 31 through 33, and 41 through 43), the switching device 70 and the tripping device 71 are similar to those of FIG. 3 described above. Further, the overcurrent detector circuit portion coupled to the current detector 41 is organized as follows.

A timing signal generator 90 outputs various timing signals: a first timing signal S1, at a period, for example, of 500 microseconds, for determining timings of the A/D conversion and a calculation operation; a second timing signal S2 at a period, for example, of 12.5 milliseconds for determining timings of the maximum value detection; and a third timing signal S3 at a period, for example, of 25 milliseconds for determining timings of output switching operation of a calculation circuit 96. In synchronism with the first timing signal S1 received from the timing signal generator 90, an A/D converter 91 coupled to the current detectors 41 samples the output of the current detectors 41 for every 500 microseconds and effects an A/D conversion thereon to obtain a digital signal corresponding to the phase current detected by the current detectors 41. In synchronism with the second timing signal S2 received from the timing signal generator 90, a maximum value detector 92 coupled to the A/D converter 91 detects the maximum value of the outputs of the A/D converter 91 over each interval of 12.5 milliseconds.

A pick-up judgement circuit 93 coupled to the maximum value detector 92 compares the maximum value detected by the maximum value detector 92 with a first predetermined threshold level which is set, for example, at 2 to 10 times the rated current of the circuit-breaker (e.g., 100 amperes). The pick-up judgement circuit 93 determines an occurrence of a pick-up level when the maximum value detected by the maximum value detector 92 exceeds the first threshold level. The pick-up judgement circuit 93 generates a pick-up signal when the output of the maximum value detector 92 exceeds the first threshold level. A calculation circuit 94 coupled to the pick-up judgement circuit 93 determines the count value corresponding to the output of the maximum value detector 92 upon receiving a pick-up signal from the pick-up judgement circuit 93, and a counter 95 coupled to the calculation circuit 94 counts (adds up) the outputs of the calculation circuit 94.

In synchronism with the first timing signal S1, a calculation circuit 96 calculates, at sampling period of 500 microseconds, for example, the square of the sampling value output from the A/D converter 91, and, in synchronism with the second timing signal S2, switches the result of the calculation in order to counters 97-1 through 97-5 at a period, for example, of 25 milliseconds. Namely, the output of the calculation circuit 96 is supplied to one of the counters 97-1 through 97-5 (for example, the counter 97-1). The counter currently supplied with the output of the calculation circuit 96 obtains the accumulation value or the sum ($\Sigma$ I$\times$I$\times$t) of the outputs of the calculation circuit 96 from the last third timing signal S3 to the next. The remaining four counters (for example, the counters 97-2 through 97-5) holds the sums of the values calculated during the previous four periods of 25 milliseconds up to the last third timing signal S3. (These four counters holding the previous accumulation values are referred to as holding counters.)

A pick-up judgement circuit 98 coupled to the counters 97-1 through 97-5 determines an occurrence of a pick-up level when the sum of the accumulation values of the four holding counters (e.g., the 97-2 through 97-5) exceeds a second predetermined threshold which is equal, for example, to the rated current of the circuit-breaker. The sum of the accumulation values kept in the four holding counters is equal to the sum of the outputs of the calculation circuit 96 over the 100 milliseconds (=4 times 25 milliseconds) ending with the last third timing signal S3. Thus, the pick-up judgement circuit 98 judges an occurrence of a pick-up level on the basis of the sum ($\Sigma$ I$\times$I$\times$t) of the outputs of the calculation circuit 96 over the past 100 milliseconds ending with the last third timing signal S3.

A calculation circuit 99 coupled to the pick-up judgement circuit 98 calculates the count value corresponding to the sum of the accumulation values kept in the holding counters (e.g., the counters 97-2 through 97-5). Namely, the calculation circuit 99 multiplies the sum of the accumulation values by a predetermined factor, thereby obtaining a count value. The count values output from the calculation circuit 99 are counted (added up) by a counter 100 coupled thereto. A trip judgement circuit 101 coupled to the counters 95 and 100 monitors the outputs thereof. Namely, when the output from the counter 95 exceeds a third predetermined threshold level, or when the output from the counter 100 exceeds a fourth predetermined threshold level, the trip judgement circuit 101 determines an occurrence of an overcurrent and outputs a tripping signal to the switching device 70. In response to the tripping signal from the trip judgement circuit 101, the switching device 70 activates the tripping device 71 to break the breaker contacts 31, 32 and 33.

Although not shown in the figure, the parts identical to those 91 through 101 are provided for the current detectors 42 and 43.

Next, the operation of the circuit of FIG. 1 is described in greater detail. The phase current detected by the current detector 41 is supplied to the A/D converter 91. In synchronism with the first timing signal S1, the A/D converter 91 samples the output of the A/D converter 91 at the sampling period of 500 microseconds and converts it into a digital signal corresponding to the detected phase current. The maximum value detector 92 monitors the digital sampling values output from the A/D converter 91 during each interval of 12.5 milliseconds, and determines the maximum value thereof. Namely, the maximum value detector 92 determines the maximum value of the digital signal output from the A/D converter 91 during each interval of 12.5 milliseconds as determined by second timing signal S2. The maximum value detected by the maximum value detector 92 for each 12.5 milliseconds is supplied to the pick-up judgement circuit 93. When the maximum value exceeds the predetermined first threshold, the pick-up judgement circuit 93 outputs a pick-up signal to the calculation circuit 94.

Upon receiving the pick-up signal from the pick-up judgement circuit 93, the calculation circuit 94 generates the count value for the counter 95 corresponding to the current maximum value output from the maximum value detector 92. The count value output from the calculation circuit 94 is determined in accordance with the operating characteristic of the circuit-breaker. For example, assume that the count value of 100 is generated by the calculation circuit 94 when the maximum value output from the maximum value detector 92 is at a first level. Then the count value generated by the calculation circuit 94 is 400 when the magnitude of the maximum value output from the maximum value detector 92 is twice the first level. More generally, the count value output from the calculation circuit 94 in response to the pick-up signal from the pick-up judgement circuit 93 may be proportional to the square of the output of maximum value detector 92.

The counter 95 sums up the outputs of the calculation circuit 94. Thus, the output of the counter 95 increases by 100 in each 12.5 milliseconds when the output of the maximum value detector 92 is at said first level, and by 400 when the output of the maximum value detector 92 is twice that level. Thus, the output of the counter 95 is equal to the accumulation value or the sum of the outputs of the maximum value detector 92 exceeding the pick-up level.

The trip judgement circuit 101 outputs a tripping signal when the output of the counter 95 exceeds the third threshold level. Assume, for example, that the third threshold level is set equal to 1000 for the the short time-limiting or almost instantaneous operation. Further assume that due to some abnormality in the three-phase AC line 10, the output of the maximum value detector 92 exceeds the pick-up level at a certain instant and the output of the the calculation circuit 94 remains at 100 thereafter. Then the trip judgement circuit 101 outputs the tripping signal after 10 (=1000/100) periods of 12.5 milliseconds, or 125 (=10 times 12.5) milliseconds. If, on the other hand, the output of the calculation circuit 94 remains at 400 after the output of the maximum value detector 92 exceeds the pick-up level, the trip judgement circuit 101 outputs the tripping signal after 3 (the least integer which is greater than or equal to 1000/400) periods of 12.5 milliseconds, or 37.5 (=3 times 12.5) milliseconds.

In response to the output of the trip judgement circuit 101, the switching device 70 outputs an activation signal to the tripping device 71, such that the tripping device 71 breaks the breaker contacts 31, 32, and 33. Thus, a short delay time operation, namely, the short time-limiting or almost instantaneous operation, the delay time of which is adjustable in units of 12.5 milliseconds, can be realized.

The parts 91 through 101 described above constitute a first system of overcurrent detection. In addition, the circuit of FIG. 1 includes a second system of overcurrent detection consisting of the parts 91 through 101. Thus, the output of the A/D converter 91 is also supplied to the calculation circuit 96. In synchronism with the first timing signal S1 generated each 500 microseconds by the timing signal generator 90, the calculation circuit 96 calculates the square of the sampling value received from the A/D converter 91. Further, in synchronism with the third timing signal S3 generated each 25 milliseconds, the calculation circuit 96 switches its output in order from the current to the next counter among the counters 97-1 through 97-5. Namely, assume that the calculation circuit 96 outputs its outputs to the counter 97-1 during the first period of 25 milliseconds. Then, during the second period, the calculation circuit 96 supplies its outputs to the counter 97-2; during the third period, to the counter 97-3; during the fourth period, to the counter 97-4; and during the fifth period, to the counter 97-5. Further, during the sixth period, output of the calculation circuit 96 is again supplied to the counter 97-1, and the cycle is repeated. When the output of the calculation circuit 96 is switched to from a current counter to the next, the next counter is reset to start counting anew.

Thus, one of the counters 97-1 through 97-5 (referred to as the current counter) which is currently supplied with the output of the calculation circuit 96 is in the process of accumulating or adding up the outputs of the calculation circuit 96 for the current period of 25 microseconds beginning with the last third timing signal S3. The other four counters (referred to as the holding counters) hold the accumulation value or the sum of the outputs of the calculation circuit 96 for the previous four periods of 25 milliseconds ending with the last third timing signal S3. For example, if the counter 97-1 is currently supplied with the outputs of the calculation circuit 96, the counter 97-2 through 97-5 hold the accumulation values for the preceding four periods of 25 milliseconds. The sum of the accumulation values kept in the four holding counters is equal to the sum of the outputs of the calculation circuit 96 over the interval of 100 milliseconds ending at the last third timing signal S3.

The accumulation values held in the four holding counters are supplied to the pick-up judgement circuit 98. When the sum of the accumulation values supplied from the four holding counters exceeds the predetermined second threshold level, the pick-up judgement circuit 98 outputs a pick-up signal. Thus, the pick-up judgement circuit 98 determines an occurrence of a pick-up level on the basis of the accumulation value or sum of the outputs of the calculation circuit 96 over the 100 milliseconds (four times the periods of 25 milliseconds) terminated at the last third timing signal S3.

In response to the pick-up signal output from the pick-up judgement circuit 98, the calculation circuit 99 calculates a count value corresponding to the sum of accumulation values of the four holding counters. Namely, the calculation circuit 99 multiplies the outputs of the four holding counters by a factor, thereby obtaining a count value supplied to the counter 100. The factor is determined in accordance with the operating characteristic of the circuit-breaker. For example, assume that the calculation circuit 99 generates a count value of 100 when the sum of the accumulation values of the four holding counters is at a first level. Then, the calculation circuit 99 generates the count value of 400 when the sum of the accumulation values of the four holding counters is twice the first level. Thus, the multiplication factor of the calculation circuit 99 quadruples when the sum of the accumulation value of the holding counters doubles.

The counter 100 adds up the outputs of the calculation circuit 99. Thus, the output of the counter 100 increases by 100 for each 25 milliseconds when the sum of accumulation values of the holding counters is at the first level, and by 400 for each 25 milliseconds when the sum of accumulation values of the holding counters doubles.

When the accumulation value output from the counter 100 exceeds a fourth threshold level, the trip judgement circuit 101 outputs a tripping signal. For example, assume that the fourth threshold level for the trip judgement circuit 101 is set at 40000 corresponding to the long time-limiting operation. Then, in the case where the count value of the counter 100 supplied from the calculation circuit 99 remains at 100 after the pick-up judgement circuit 98 outputs a pick-up signal, the trip judgement circuit 101 outputs the tripping signal after 10 second (=25 milliseconds times 40000/100), and in the case where the count value of the counter 100 supplied from the calculation circuit 99 remains at 400 after the pick-up judgement circuit 98 outputs a pick-up signal, the trip judgement circuit 101 outputs the tripping signal after 2.5 seconds (=25 milliseconds times 40000/400).

In response to the tripping signal of the trip judgement circuit 101, the switching device 70 activates the tripping device 71 to break the breaker contacts 31 through 33. Thus, a long time-limiting or a long delay time operation, the delay time of which is adjustable in units of 25 milliseconds, can be realized. Thus, according to this embodiment, a short delay time operation the delay time of which is adjusted by short units of 12.5 milliseconds and a long delay time operation the delay time of which is adjusted by short units of 25 milliseconds can be realized.

As noted above, the parts identical to the parts 91 through 101 are provided for the current detectors 42 and 43, respectively, and operate in a similar manner.

Figure 2:
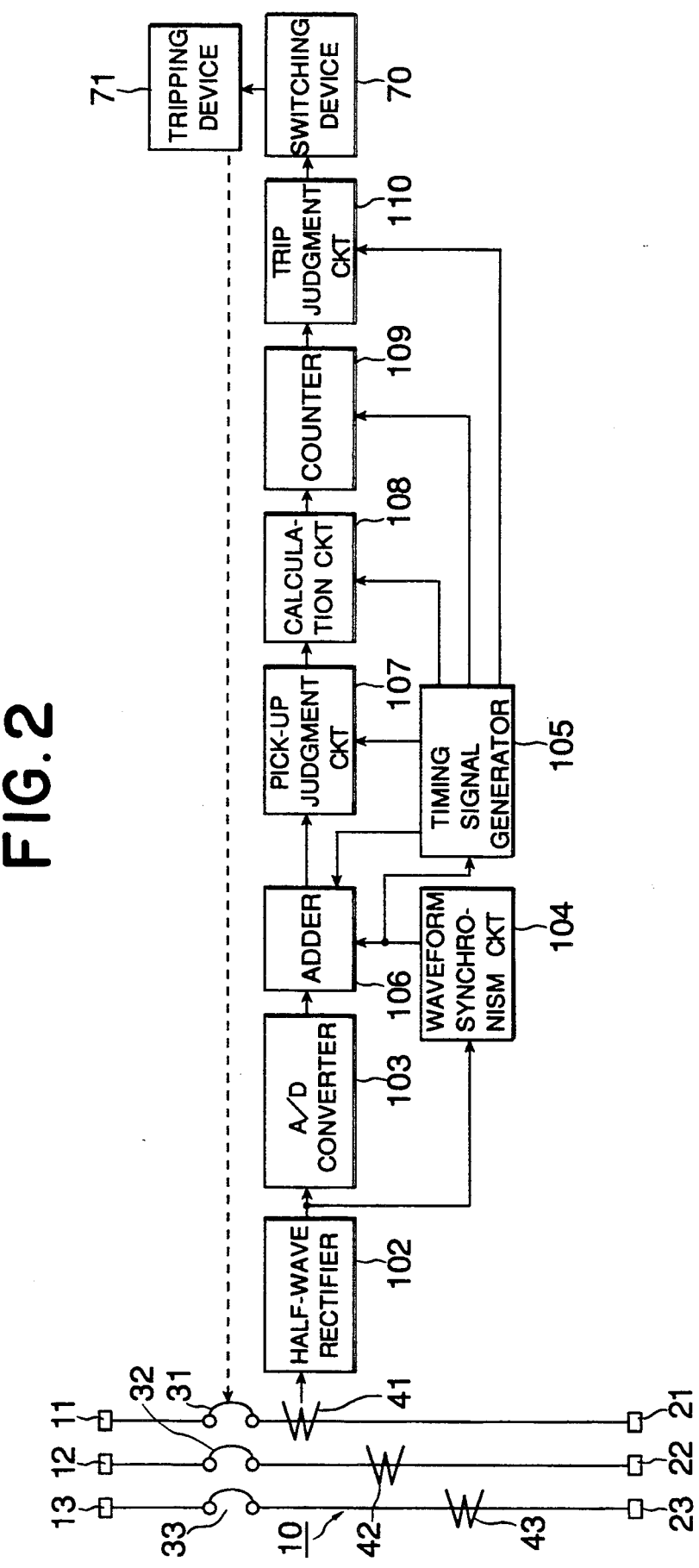
FIG. 2 is a block diagram showing the structure of another overcurrent detector circuit for a circuit-breaker according to this invention.

FIG. 2 is a block diagram showing the structure of another overcurrent detector circuit for a circuit-breaker according to this invention, where the three-phase AC line 10 (including the parts 11 through 13, 21 through 23, 31 through 33, and 41 through 43), the switching device 70 and the tripping device 71 are similar to those of FIG. 1.

In FIG. 2, the output of the current detectors 41 is coupled to a half-wave rectifier 102. The output of the half-wave rectifier 102 is coupled to an A/D converter 103 and the waveform synchronism circuit 104. The A/D converter 103 samples the output of the half-wave rectifier 102 at a sampling period of, for example, 500 microseconds and converts it to a digital signal. The waveform synchronism circuit 104 detects the rising point of the output waveform of the half-wave rectifier 102. Namely, the waveform synchronism circuit 104 outputs a signal when the output waveform of the half-wave rectifier 102 reaches a predetermined level, which is set at several percent of the rated current of the circuit-breaker. In synchronism with the output of the waveform synchronism circuit 104, a timing signal generator 105 generates various timing signals.

An adder 106, coupled to the A/D converter 103, the waveform synchronism circuit 104, and the timing signal generator 105, is activated in response to the output of the waveform synchronism circuit 104. After the activation, during an interval of time (e.g., 10 milliseconds) which is longer than or equal to one half of the period corresponding to the utilizable minimum power source frequency, and less than or equal to the period corresponding to the utilizable maximum power source frequency, the adder 106 adds up the square of the outputs of the A/D converter 103. The adder 106 is activated upon receiving a signal from the waveform synchronism circuit 104 and de-activated upon receiving a timing signal from the timing signal generator 105. Thus, each adding interval of the adder 106 begins upon receiving a signal from the waveform synchronism circuit 104 and is terminated upon receiving a timing signal from the timing signal generator 105.

The adder 106 outputs the sum thus obtained to a pick-up judgement circuit 107 coupled to the timing signal generator 105 and the adder 106. In synchronism with the timing signal received from the timing signal generator 105, the pick-up judgement circuit 107 monitors the output of the adder 106 and outputs a pick-up signal to a calculation circuit 108 if the output of the adder 106 exceeds a threshold level. Further, in response to the pick-up signal output from the pick-up judgement circuit 107 and the timing signal supplied from the timing signal generator 105, the calculation circuit 108 calculates and outputs the count value corresponding to the sum output from the adder 106. A counter 109 coupled to the calculation circuit 108 adds up the count values output from the calculation circuit 108.

A trip judgement circuit 110, coupled to the timing signal generator 105 and the counter 109, monitors the output of the counter 109, and, when the count value of the counter 109 exceeds a threshold level, outputs a tripping signal in synchronism with the timing signal supplied from the timing signal generator 105. The threshold level is determined in accordance with the operating characteristic of the circuit-breaker. In response to the tripping signal from the trip judgement circuit 110, the switching device 70 activates the tripping device 71 to break the breaker contacts 31 through 33.

Although not shown in the figure, the parts identical to the parts 91 through 110 are provided for the current detectors 42 and 43.

Next the operation of the circuit of FIG. 2 is described in detail. The phase current detected by the current detector 41 is half-wave rectified by the half-wave rectifier 102 and thence is supplied to the A/D converter 103 and the waveform synchronism circuit 104. The A/D converter 103 samples the output of the half-wave rectifier 102 at the sampling period of 500 microseconds and converts it to a corresponding digital value. The waveform synchronism circuit 104 detects the waveform rising point. Namely, the waveform synchronism circuit 104 outputs a signal at each time point at which the output of the half-wave rectifier 102 reaches a predetermined positive level, which is set, for example, several percent of the rated current of the circuit-breaker.

In response to the output of the waveform synchronism circuit 104, the adder 106 starts to accumulate or add up the square of the outputs of the A/D converter 103 which are generated at the period of 500 microseconds. The accumulation or addition by the adder 106 continues until terminated by the timing signal from the timing signal generator 105. Thus, the addition extends, for example, over an interval equal to one half of the period of the current flowing through the three-phase AC line 10. In synchronism with the timing signal supplied from the timing signal generator 105, the adder 106 outputs the sum ($\Sigma$ I$\times$I$\times$t) to the pick-up judgement circuit 107. This corresponds to the sum of the square of levels of the half-rectified waveform over the interval. In synchronism with the timing signal supplied from the timing signal generator 105, the pick-up judgement circuit 107 outputs a pick-up signal to the calculation circuit 108 when the sum output from the adder 106 exceeds a predetermined threshold level.

In response to the pick-up signal of the pick-up judgement circuit 107, the calculation circuit 108 outputs a count value to the counter 109 in synchronism with the timing signal supplied from the timing signal generator 105. Namely, the calculation circuit 108 multiplies the output of the adder 106 by a predetermined factor, thereby obtaining the count value for the counter 109. The counter 109 adds up the count values output from the calculation circuit 108. Thus, the output of the counter 109 is incremented in each period of the power source if the output of the adder 106 for the same period exceeds the pick-up level. For example, the output of the counter 109 is incremented each 20 milliseconds when the power source frequency is at 50 Hz, and each 16.7 milliseconds when the power source frequency is at 60 Hz.

In synchronism with the timing signal supplied from the timing signal generator 105, the trip judgement circuit 110 outputs a tripping signal when the output of the counter 109 exceeds a predetermined threshold level. In response to the tripping signal supplied from the trip judgement circuit 110, the switching device 70 activates the tripping device 71 to break the breaker contacts 31 through 33. As a result, an overcurrent detector circuit for a circuit-breaker with a short time-limiting operation or a short delay time operation can be realized by a simple circuit structure. The delay time is 20 milliseconds if the power source frequency is 50 Hz. However, the reliability of the tripping operation is improved since the output of adder 106 is approximately equal to the integral of the square of the waveform of the detected current over the half-period, and the counter 109 adds up the outputs of the adder 106 exceeding the pick-up level.

By the way, the operations of the above embodiments may be realized by means of softwares stored in a microcomputer. Further, in the case of the second embodiment, the waveform synchronism circuit 104 may be supplied with its input from the output of the A/D converter 103 instead of from the output of the half-wave rectifier 102.

What is claimed is:

1. An overcurrent detector circuit for a circuit-breaker including at least one contact for disconnecting a line, and a tripping device means for breaking said contact, said overcurrent detector circuit comprising:

current detector means for detecting a current flowing through said line, said current detector generating an output corresponding to a detected current;

analog-to-digital converter means, coupled to said current detector means, for sampling said output of said current detector at a first predetermined period and converting sampled outputs of said current detector to corresponding digital signals;

maximum value detector means, coupled to said analog-to-digital converter means, for determining a maximum value of said digital signals output from said analog-to-digital converter means within a second predetermined period longer than said first period;

first accumulation means, coupled to said maximum value detector means, for accumulating values corresponding to said maximum values determined by said maximum value detector means exceeding a first threshold level;

second accumulation means, coupled to said analog-to-digital converter means, for accumulating values corresponding to said digital signals output from said analog-to-digital converter means during a third predetermined period longer than said second period;

third accumulation means, coupled to said second accumulation means, for accumulating values corresponding to output values of said second accumulation means exceeding a second threshold level; and judgement means, coupled to said first and third accumulation means, for activating said tripping device means to break said contact when an output of said second accumulation means exceeds a third threshold level or when an output of said third accumulation means exceeds a fourth threshold level.

2. An overcurrent detector circuit as claimed in claim 1, wherein said second period is an integral multiple of said first period and said third period is an integral multiple of said second period.

3. An overcurrent detector circuit as claimed in claim 1, wherein said second accumulation means includes:

calculation circuit means for squaring said digital signals of said analog-to-digital converter means; and means for accumulating output values said calculation circuit means over said third period.

4. An overcurrent detector circuit as claimed in claim 1, wherein said second accumulation means includes:

calculation circuit means for squaring said digital signals of said analog-to-digital converter means; and at least three counters arranged in order and coupled respectively to said calculation circuit means, said counters accumulating output values of said calculation circuit means over said third period, wherein: said calculation circuit means switches outputs thereof in order to said counters at a predetermined fourth period, said third period being an integral multiple of said fourth period; a counter currently receiving outputs from said calculation circuit means accumulates outputs of said calculation circuit means over current fourth period; and counters other than said counter currently receiving outputs from said calculation circuit means together hold output values of said calculation circuit means accumulated over said third period.

5. An overcurrent detector circuit for a circuit-breaker including at least one contact for disconnecting a line carrying an alternating current, and a tripping device means for breaking said contact, said overcurrent detector circuit comprising:

current detector means for detecting a current flowing through said line, said current detector generating an output corresponding to a waveform of said current;

half-wave rectifier means coupled to said current detector means, for half-wave rectifying said output waveform of said current detector means, said half-wave rectifier means outputting a half-wave rectified waveform;

analog-to-digital converter means, coupled to said half-wave rectifier means, for sampling said half-wave rectified waveform at a first predetermined period and converting sampled values to corresponding digital signals;

waveform synchronism circuit means for detecting a rising point of said half-wave rectified waveform, said waveform synchronism circuit outputting a detection signal upon detection of said rising point;

first accumulation means, coupled to said analog-to-digital means and said waveform synchronism circuit means, for accumulating squares of said digital signals in response to said detection signal over a second predetermined period longer than said first period, said first accumulation means outputting an accumulation value for each period of said waveform of said current;

second accumulation means, coupled to said first accumulation means, for accumulating values corresponding to accumulation values output from said first accumulation means exceeding a first threshold level; and a judgement means, coupled to said second accumulation means, for activating said tripping device when an output of said second accumulation means exceeds a second threshold level.

6. An overcurrent detector circuit as claimed in claim 5, wherein said second period is not shorter than one half of a period corresponding to a minimum frequency of said current flowing through said line and not longer than a period corresponding to a maximum frequency of said current flowing through said line.

* * * * *